April 27, 1954     A. J. HIRST     2,676,774
RESILIENT MOUNTING AND SUPPORT
Filed March 15, 1948     3 Sheets-Sheet 1
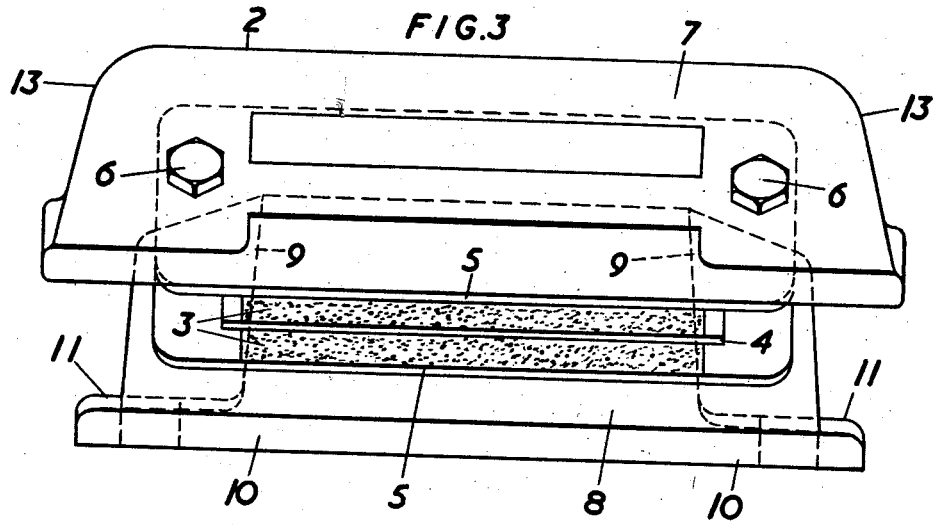
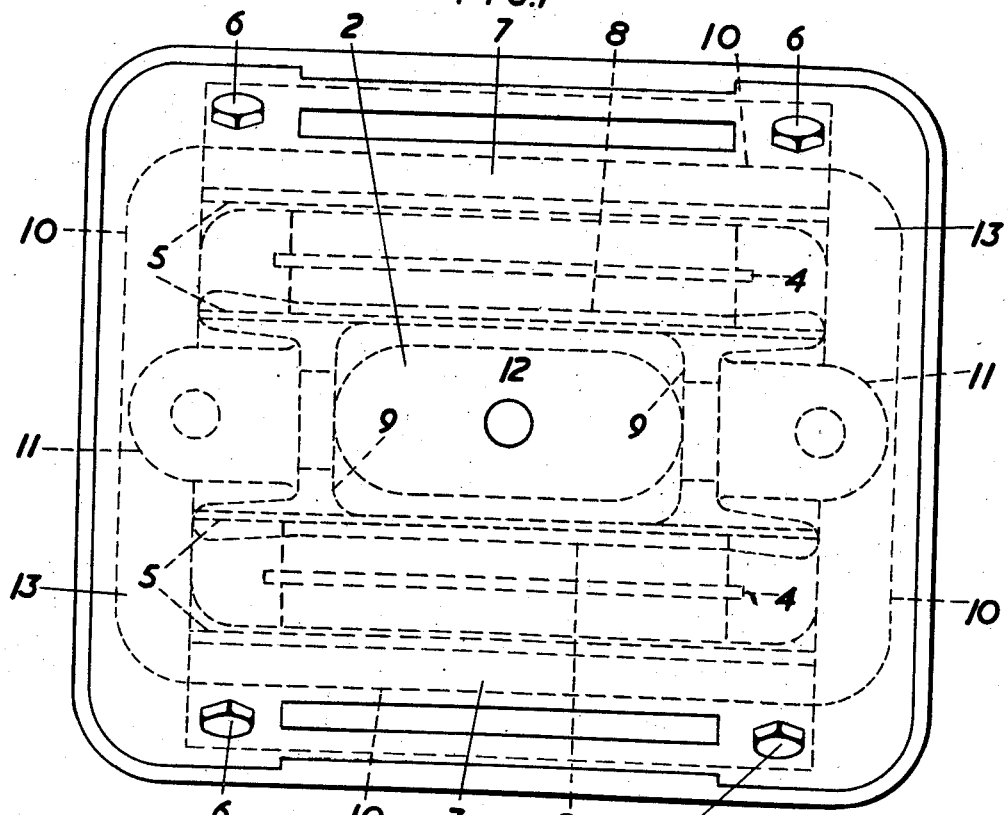
INVENTOR
Archie John Hirst.
BY
Harness, Dickey & Pierce.
ATTORNEYS.

April 27, 1954

A. J. HIRST 2,676,774

RESILIENT MOUNTING AND SUPPORT

Filed March 15, 1948

INVENTOR
Archie John Hirst.
BY
Harness, Dickey & Pierce.
ATTORNEYS.

April 27, 1954 A. J. HIRST 2,676,774
RESILIENT MOUNTING AND SUPPORT
Filed March 15, 1948 3 Sheets-Sheet 3
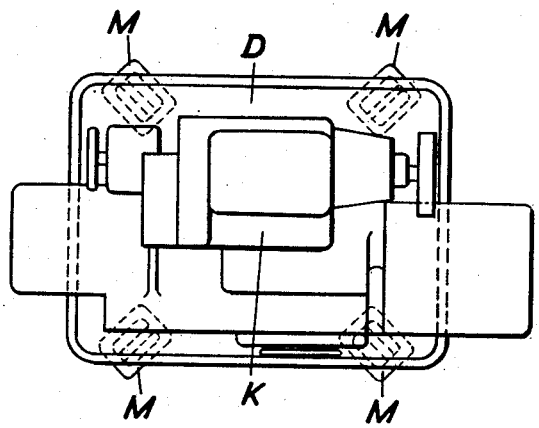
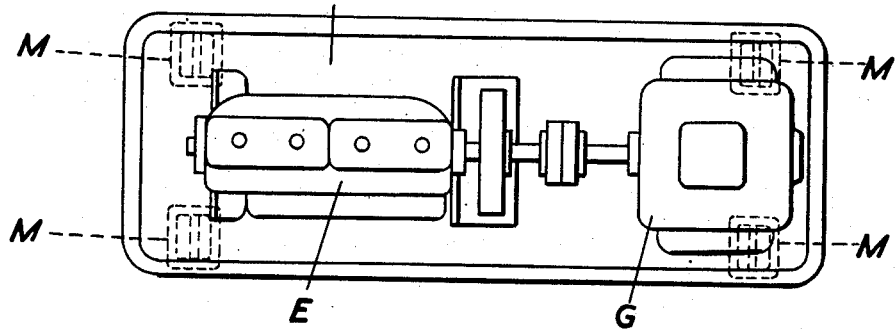
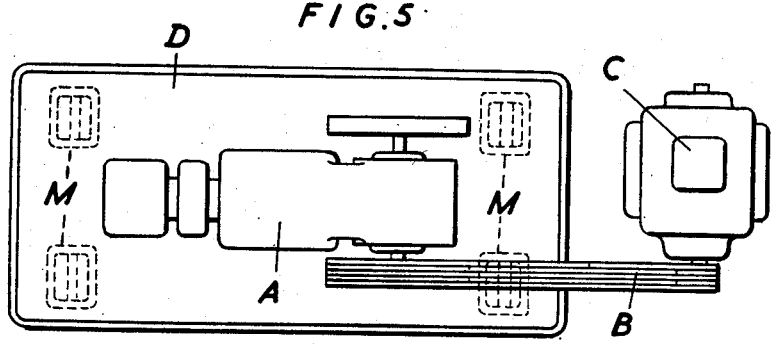
INVENTOR
Archie John Hirst.
BY
Harness, Dickey & Pierce.
ATTORNEYS.

Patented Apr. 27, 1954

2,676,774

UNITED STATES PATENT OFFICE 2,676,774

RESILIENT MOUNTING AND SUPPORT

Archie John Hirst, Leicester, England, assignor to Metalastik Limited, Leicester, England, a British company Application March 15, 1948, Serial No. 14,913

Claims priority, application Great Britain June 6, 1947

5 Claims. (Cl. 248—22)

This invention relates to resilient mountings or supports of the kind comprising a rigid metal base which stands upon or is adapted to be secured to a suitable surface or bed and a metal platform which receives or is adapted to be secured to the machine or other object to be supported, the said platform being maintained in spaced relation to the metal base by interposed resilient rubber elements which may be interleaved with metal. Usually the resilient rubber elements in this kind of anti-vibration mounting have been so arranged that they operate in direct compression to support the normal or vertically applied load.

In an anti-vibration mounting or support of the kind referred to and according to the present invention those surfaces of the metal parts between which the resilient rubber elements are interposed and which transmit the load thereto are at such an angle to the support surfaces that the normal or vertically applied load is resisted by the rubber of the resilient elements operating in both compression and shear.

A preferred constructional arrangement comprises two laterally opposed rubber pad elements which are downwardly and outwardly inclined and disposed symmetrically with respect to a vertical centre plane of the mounting and each making an acute external angle, preferably greater than 45°, with the upper or supporting surface of the platform, said rubber pad elements being interposed between and preferably secured to correspondingly inclined and inwardly facing side surfaces provided on said platform and correspondingly inclined and outwardly facing side surfaces on the base. The inwardly facing inclined side surfaces on the platform overhang the rubber pad elements and preferably are interconnected by end walls so that the platform with its inclined sides and end walls constitutes a cover which shrouds the rubber pad elements so as to protect them from oil or other deleterious materials.

The resilient elements may comprise single rubber pads surface bonded between metal attachment plates to form an easily attachable unit for securing to the confronting inclined side surfaces of the platform or cover and the base, or each resilient element may be of the multi-sandwich type comprising two or more pads of rubber interleaved by and surface bonded to metal plates, the outer pads being also surface bonded to attachment plates.

Figures 1, 2, 3 and 4 are respectively a plan, a sectional end elevation, a side elevation and a sectional side elevation of a resilient mounting.

Figures 5, 6 and 7 are diagrammatic plan views illustrating various practical applications of the resilient mounting shown in Figures 1 to 4.

Figure 2:
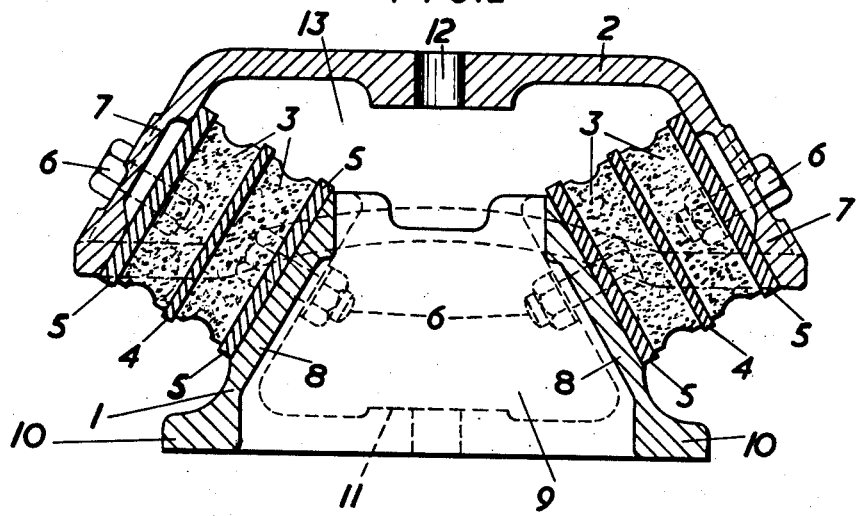
Figure 4:
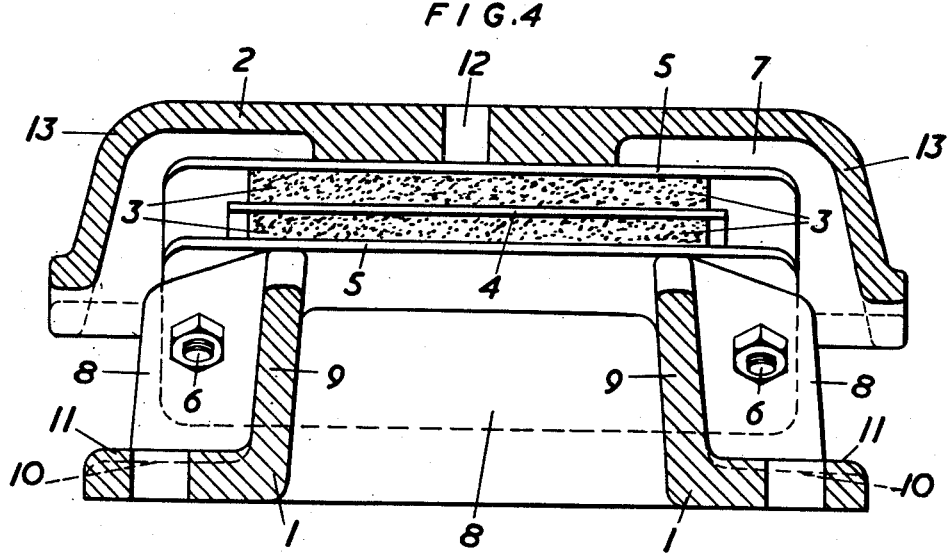

Referring to the drawings, the mounting comprises a metal casting 1 constituting the base, a metal casting 2 constituting the load supporting platform, and two interposed resilient rubber elements of the multi-sandwich type which support the platform casting upon and in spaced relation to the base casting. Each of the rubber sandwiches comprises two pads 3 of rubber which are surface bonded to the opposite side faces of a rigid metal interleaf 4 and to metal attachment plates 5 which are longer than the pads 3 and the interleaf 4 and are provided in their projecting ends with holes for attachment bolts 6.

The flat upper portion of the casting 2, which constitutes the platform or the supporting surface proper, is formed with depending side walls 7 which are oppositely inclined outwardly at an angle of approximately 60° to the platform surface and are confronted by and spaced from correspondingly inclined side walls 8 of the hollow base casting 1, which walls 8 are interconnected by transverse or end walls 9. The bottom of the base casting 1 is formed as a laterally projecting marginal flange 10 which is formed at each end with apertured bosses 11 to take fixing bolts for securing the mounting to the floor or bed, whilst the centre portion of the platform or cover casting 2 is thickened and provided with a through hole, indicated by the reference 12, for a mounting bolt for securing the foot of the machine to the platform. The end portions of the inclined side walls 7 and 8 are provided with holes for the attachment bolts 6 which clamp the attachment plates 5 of the rubber sandwiches 3 to the confronting inclined faces of said walls. The side walls 7 of the platform overhang the resilient sandwiches 3 so as to protect them from oil or other deleterious material, and these walls are interconnected by downwardly and outwardly inclined end walls 13 which overhang the ends of the base casting 1.

It will be seen that the mounting is symmetrical with respect to its vertical and longitudinal centre plane and that the vertical load upon the mounting will be supported by the resilient sandwiches operating in compression and shear. Also it will be appreciated that horizontal loads at right angles to the longitudinal plane of symmetry will be resisted by one or other of the resilient sandwiches operating in compression and shear but mainly in compression, and that horizontal loads in a longitudinal direction will be taken by the resilient sandwiches operating in shear only. Thus for horizontal loadings at right angles to the longitudinal centre plane the resilient sandwiches have the greatest stiffness, being loaded mainly in compression, and for horizontal loadings in the direction of said plane the resilient sandwiches, being loaded only in shear, have the least stiffness and greatest flexibility, the stiffness varying progressively between these two extremes. In any particular application of a set or plurality of the mountings, advantage can be taken of this varying horizontal stiffness characteristic by appropriate disposition of the mountings so that their longitudinal vertical centre planes are at such an angle to the horizontal loading as to secure the best results.

Figure 5 illustrates an application of a set of four mountings, indicated generally by the reference letter M, to the support of a machine A which is operated by a belt-drive B from an independently mounted motor C. In such an application the machine mounting is required to offer sufficient resilient resistance to counteract the pull of the belt drive, but a fair degree of flexibility is permissible in both a vertical direction and in a horizontal direction at right-angles to the drive. To meet these conditions the mountings M, positioned below the corners of the base plate D of the machine, are arranged with their longitudinal vertical centre plates at right-angles to the direction of the drive so that the horizontal pull of the belt will be resisted mainly by the compressive resistance of the resilient sandwiches. Vertical loading is taken care of by the resilient sandwiches operating in compression and shear and horizontal loadings at right-angles to the belt pull will be counteracted by the resilient sandwiches operating in longitudinal shear.

Figure 6 illustrates an application of a set of four mountings M for supporting a multi-cylinder vertical engine E driving a generator G, the engine and generator having a common base plate D. In this application the mountings are arranged, one at each corner of the base plate, with their longitudinal vertical centre planes at right-angles to the aligned driving and driven shafts so as to provide the maximum horizontal stiffness in the direction in which there is practically no vibration and maximum flexibility in a transverse direction to absorb lateral vibrations. Torsional vibration about an axis well above the base plate will cause deflection of the resilient mountings both vertically and transversely and, as a result of the high flexibility of the mountings in the transverse direction, the transmission to the floor of horizontal vibration due to torque as well as unbalance will be prevented or materially reduced.

Figure 7 illustrates an application in which a set of four mountings M are arranged below the bed plate D of a machine K and symmetrically with respect to a vertical axis, the angular dispositions of the mountings M being such that their planes of maximum flexibility are radial and those of maximum stiffness are tangential so as to resist any tendency for the machine to twist about said vertical axis. In some applications of this symmetrical arrangement, it may be advantageous to turn each mounting through 90° from the position shown so that there would be much greater flexibility for twist of the machine and much greater resistance to horizontal loads in radial directions. Also the number of similar mountings employed with either of these latter symmetrical arrangements may be increased and be such as to give a practically uniform stiffness rate or equi-frequency in all radial directions of movement in a horizontal plane.

The base and cover or platform portions of the mountings may be standardised and, similarly, standardised resilient units, bonded to plates for attachment to the base and cover, may be provided for determined loads. In this latter connection the standardised resilient units are preferably so designed, as to the hardness of the rubber employed and the number of interleaves, if any, that they will all have substantially the same deflection under their respective determined vertical loadings.

I claim:

1. An antivibration mounting comprising a base member, a platform member and resilient bearing means between said members, said base member having only a pair of spaced plane bearing surfaces each inclined to the horizontal at an angle greater than 45 degrees, said bearing surfaces of said base member converging upwardly and being so disposed that upward extensions thereof would intersect in a horizontal line, said platform having only a pair of spaced plane bearing surfaces respectively parallel to and spaced from said bearing surfaces of said base member, said resilient bearing means comprising a pair of resilient sandwiches each disposed between one of said first named bearing surfaces and the adjacent of said bearing surfaces on said platform, each of said resilient sandwiches being laminated of flat plates and flat resilient rubber material bonded to said plates, the outer laminations of said sandwiches being secured to said members in abutting engagement with one of said bearing surfaces, said sandwiches having clearance between their edges and said members and having an intermediate plate supported only through the rubber material to which it is bonded and freely movable in response to deformation of said rubber material, said bearing surfaces being so disposed that a horizontal loading of said mounting in the direction of said horizontal line is opposed by said sandwiches acting only in shear and vertical loading of said platform is opposed by said sandwiches acting in compression and in shear.

2. An antivibration mounting comprising a rigid rectangular base having a pair of oppositely disposed upstanding side walls, a rigid rectangular platform surmounting the base and having a pair of oppositely disposed depending side walls, which platform is so disposed with respect to the base that the side walls of the platform overhang and are spaced from those of the base, plane bearing surfaces on said oppositely disposed side walls of both the base and platform, the plane surfaces on the side walls of the base converging toward an imaginary line above the base and confronting the plane surfaces on the side walls of the platform which converge toward an imaginary line above the platform, and resilient rubber elements sandwiched between said confronting plane surfaces and anchored thereto, the resilient rubber elements forming the sole connection between said base and platform, said resilient rubber element comprising a rubber pad sandwiched between and bonded to flat metal plates which overhang opposite sides of the pad and are adapted to be rigidly secured at their overhanging portions to the confronting plane bearing surfaces of the platform and base.

3. An anti-vibration mounting, comprising a rigid oblong rectangular base having a pair of oppositely disposed upstanding side walls extending lengthwise with respect to the base, a rigid oblong rectangular platform surmounting the base and having a pair of oppositely disposed depending side walls extending lengthwise with respect to the platform which is so disposed in relation to the base that the side walls of the platform overhang and are spaced from those of the base, plane bearing surfaces on said side walls of the base and platform, the plane bearing surfaces on the side walls of the base converging towards an imaginary line above the plane of the base and confronting the plane bearing surfaces on the side walls of the platform which converge towards an imaginary line above the platform, flat metal plates seated on said confronting plane surfaces and secured at their ends to said side walls, and a resilient rubber element interposed between each pair of said flat plates on the confronting plane bearing surfaces and bonded to said plates, the resilient rubber elements forming the sole connection between said base and platform and being disposed, each element intermediate the ends of the plates to which it is bonded so that the plates overhang opposite sides of the element.

4. An antivibration mounting as specified in claim 3 in which each resilient rubber element comprises rubber pads bonded one to each plate of a pair of said confronting flat plates, and a flat metal leaf interposed between and bonded to said rubber pads.

5. An antivibration mounting comprising a rigid rectangular base having a pair of oppositely disposed upstanding side walls, a rigid rectangular platform surmounting the base and having a pair of oppositely disposed depending side walls, which platform is so disposed with respect to the base that the side walls of the platform overhang and are spaced from those of the base, plane bearing surfaces on said oppositely disposed side walls of both the base and platform, the plane surfaces on the side walls of the base converging toward an imaginary line above the base and confronting the plane surfaces on the side walls of the platform which converge toward an imaginary line above the platform, and resilient rubber elements sandwiched between said confronting plane surfaces and anchored thereto, the resilient rubber elements forming the sole connection between said base and platform, in which said plane bearing surfaces of said pair of depending side walls on said platform are similarly inclined to said plane bearing surfaces of said pair of oppositely disposed upstanding side walls of said base.

References Cited in the file of this patent

UNITED STATES PATENTS

| Number | Name | Date |
|---|---|---|
| 2,259,049 | Swan et al. | Oct. 14, 1941 |
| 2,287,316 | Lord | June 23, 1942 |
| 2,317,190 | Henshaw | Apr. 20, 1943 |
| 2,322,844 | Goldschmidt | June 29, 1943 |
| 2,365,421 | Lord | Dec. 19, 1944 |
| 2,367,830 | Kubaugh | Jan. 23, 1945 |

FOREIGN PATENTS

| Number | Country | Date |
|---|---|---|
| 210,639 | Switzerland | Oct. 1, 1940 |
| 514,752 | Great Britain | Nov. 16, 1939 |